UNITED STATES PATENT OFFICE.

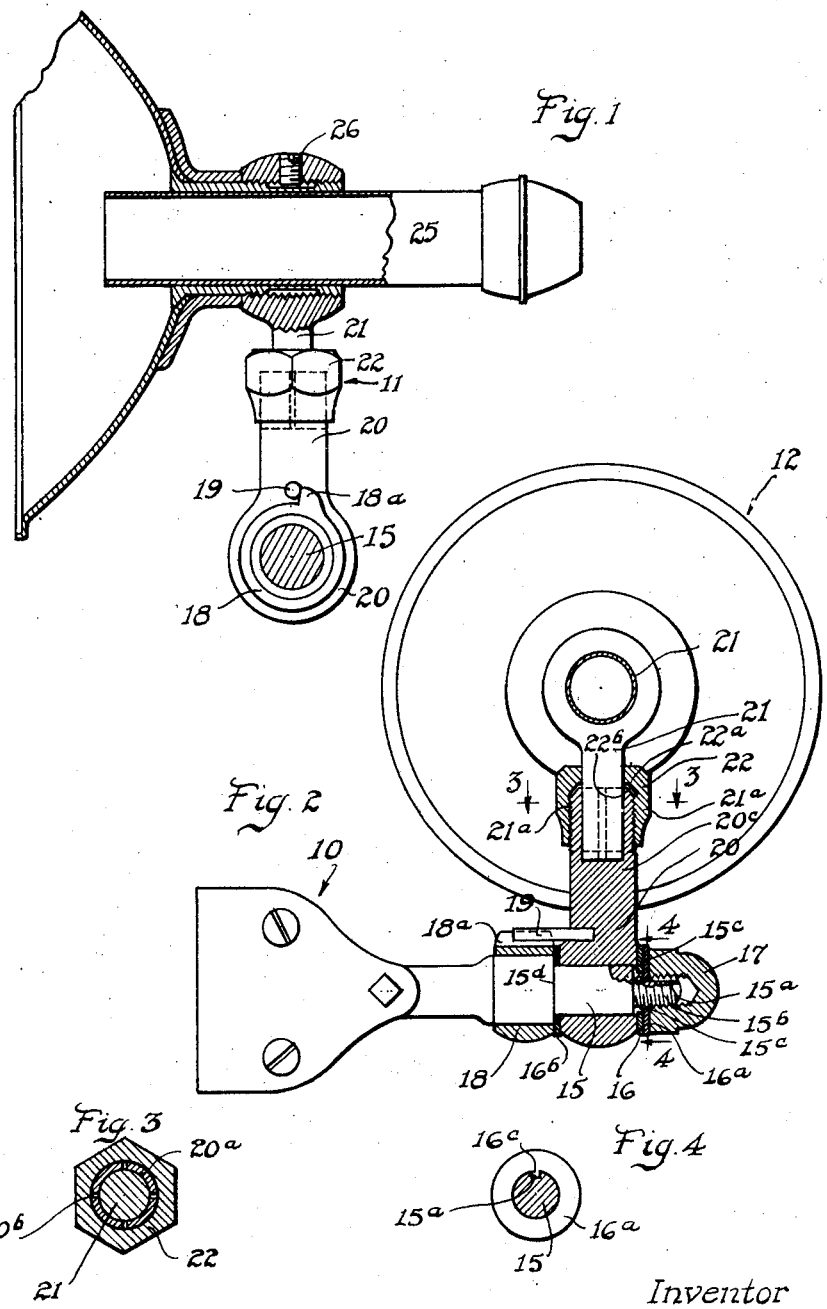

EARL H. HOWARD, OF LOS ANGELES, CALIFORNIA, ASSIGNOR TO GILFILLAN BROS. SMELTING & REFINING COMPANY, OF LOS ANGELES, CALIFORNIA, A CORPORATION OF CALIFORNIA.

UNIVERSAL JOINT FOR SPOT-LIGHTS.

1,344,344.  Specification of Letters Patent.  Patented June 22, 1920.

Application filed November 3, 1919. Serial No. 335,332.

*To all whom it may concern:*

Be it known that I, EARL H. HOWARD, a citizen of the United States, residing at Los Angeles, in the county of Los Angeles, State of California, have invented new and useful Improvements in Universal Joints for Spot-Lights, of which the following is a specification.

This invention relates to universal joints for automobile spotlights, the object being to make a simple, sightly device, easy to adjust and to be manufactured cheaply. In this application I am merely claiming the specific device shown as a universal joint, leaving out the lamp holding and clamping means. It is plainly obvious that said joint could be used for movably holding other devices.

The invention in this device lies in the manner in which the light supporting standard is rotatably mounted on the universal member which is a part of the universal joint, and in the means of connecting said universal member to the horizontal axis; the horizontal axis being attached to a clamp for holding the device on an automobile.

I will explain in detail a preferred form of which is shown in the accompanying drawings, in which—

Figure 1 is a side elevation showing the joint with a spotlight attached thereto; Fig. 2 is a section taken on line 2—2 on Fig. 1, showing in detail the construction of my joint; Fig. 3 is a section taken on line 3—3 on Fig. 2; and Fig. 4 is a section taken on line 4—4 on Fig. 2.

In these drawings numeral 10 designates the clamping means by which the whole spotlight is attached to an automobile, 11 the universal joint and 12 the reflector. The clamping means are made so as to be adjustable and fit snugly and tightly to the stationary upright of a windshield.

Referring now to the universal joint the numeral 15 designates the horizontal shaft to which the remainder of the device is swung. This shaft 15 is key-slotted at $15^a$ at its reduced end as is shown in Fig. 2 and washers 16 and $16^a$ are placed as shown, the inner one being a fiber friction washer. This shaft 15 is reduced as shown at $15^b$ and shouldered at $15^c$, the shoulder not bearing against the fiber washer 16. A fiber friction washer $16^b$ is placed as shown and bears directly against stationary sleeve 18, or against shoulder $15^d$. Metal washer $16^a$ fits around the small end of the shaft and is keyed thereon by a tongue $16^c$ which extends into key-way $15^a$.

As shown in the drawings universal member 20 fits around shaft 15 and turns between the two friction washers 16 and $16^b$. With the use of these two friction washers and the keyed washer 16 the turning of universal member 20 on shaft 15 will not tend to turn nut 17 to tighten or loosen it. This universal member 20 carries standard 21, the standard fitting into the cylindrical socket provided at $20^a$. The wall of this socket is slit longitudinally as shown and thus comprises four separate pieces having a thread $21^a$ at the upper end. The socket walls are held together by screwing down on threaded nut 22. The socket in member 20 is made to snugly fit around standard 21, the clearance normally being very small; and slits at $20^b$ are preferably carried down to the base of the socket, so that, even though the threads are not necessarily tapered, the screwing of the nut 22 onto the socket threads causes the tapered upper end $22^a$ of the nut to engage the corresponding taper $22^b$ on the upper end of the socket and causes the socket walls to contract and frictionally hold the standard 21. By moving the nut, adjustment of the amount of friction may be made. The lamp may be easily removed from the universal member by loosening the nut. The comparatively large effective frictional area makes wear negligible.

On stationary adjustable sleeve 18 I place a lug $18^a$. This lug $18^a$ engages with pin 19 and stops the turning backward of universal member 20. This pin is stationarily mounted in universal member 20, and the sleeve 18 is adjusted in such a position that the universal member 20 can not be swung back of a vertical or slightly forwardly inclined position. This keeps the rays of light from being projected into an approaching person's eyes.

Standard 21 holds light socket tube 25 at its upper end, set screw 26 holding said tube in place. For focusing adjustment member 25 may be shoved forward or backward, which moves the light forward or backward in the reflector.

The universal joint here described is peculiarly adapted to spotlights and the like. It is neat and sightly in appearance, has no projecting parts—is "clean cut." It gives good and solid support to the lamp and at the same time allows the lamp to be readily moved to different positions. On the whole I have provided a universal joint which is easy to adjust and which may be handled easily on a machine, simple in character and sightly in appearance; and the following claims are directed to these features of the universal joint.

In another application I am describing and claiming the lamp reflector and socket holding means, as shown in Fig. 1 of the drawings.

Having described a preferred form of my invention, I claim:

1. In a device of the character described, a supporting member, a universal member mounted on an axis on the supporting member, adjustable friction means to oppose movement of the universal member about its axis, a cylindrical socket in the universal member on an axis substantially at right angles to the axis about which the member turns, a lamp carrying standard fitting said socket the walls of the socket being longitudinally split and the end of the socket walls having exterior threads, and a nut adapted to screw onto the socket threads and having a tapered part to compress the socket walls about the standard.

2. In a device of the character described, a supporting member having a shouldered shaft, a friction washer around the shaft against the shoulder, a universal member mounted on the shaft and bearing at one side against the washer, the shaft having a reduced end and another shoulder near the opposite side of the universal member, another friction washer around the reduced portion of the shaft and bearing against the last mentioned side of the universal member, screw threads on the reduced shaft portion and a nut thereon to press the friction washer against the universal member, the universal member having a cylindrical extension directly opposite the part which is mounted on the shaft and at right angles to the shaft, the extension having a cylindrical socket extending from its end a considerable distance into the extension, the walls of the socket being split longitudinally and the end of the socket being tapered, a lamp carrying standard, threads on the exterior of the socket walls, and a threaded nut adapted to screw onto said threads and having a tapered part at one end adapted to engage the tapered end of the socket to compress the socket walls around the standard.

In witness that I claim the foregoing I have hereunto subscribed my name this 11th day of October 1919.

EARL H. HOWARD.

Witness:
VIRGINIA BERINGER.